US010626479B2

(12) United States Patent
Assoun

(10) Patent No.: US 10,626,479 B2
(45) Date of Patent: Apr. 21, 2020

(54) PLASMAS FOR EXTRATERRESTRIAL RESOURCES AND APPLIED TECHNOLOGIES (PERT) SPACE DEBRIS REMEDIATION, MINING, AND REFINING

(71) Applicant: Christian Daniel Assoun, Pasadena, CA (US)

(72) Inventor: Christian Daniel Assoun, Pasadena, CA (US)

( * ) Notice: Subject to any disclaimer, the term of this patent is extended or adjusted under 35 U.S.C. 154(b) by 190 days.

(21) Appl. No.: 15/698,847

(22) Filed: Sep. 8, 2017

(65) Prior Publication Data

US 2018/0073361 A1    Mar. 15, 2018

Related U.S. Application Data

(60) Provisional application No. 62/385,858, filed on Sep. 9, 2016.

(51) Int. Cl.
*C22B 4/00* (2006.01)
*H01J 49/30* (2006.01)
(Continued)

(52) U.S. Cl.
CPC .......... *C22B 4/005* (2013.01); *F03H 1/0081* (2013.01); *H01J 49/30* (2013.01); *H01J 49/38* (2013.01); *Y02P 10/212* (2015.11)

(58) Field of Classification Search
CPC .......... C22B 4/005; B64G 4/00; E21C 51/00; G01V 11/002; G21D 7/02; H05H 1/48; H05H 1/54
(Continued)

(56) References Cited

U.S. PATENT DOCUMENTS 3,329,396 A * 7/1967 Heaton ................ C03B 7/088
251/212
8,357,884 B1 * 1/2013 Ethridge ................ H05B 6/80
219/679
(Continued)

FOREIGN PATENT DOCUMENTS

WO   WO 2008 055684 A1   5/2008
WO   WO 2008 064496 A2   6/2008
(Continued)

OTHER PUBLICATIONS

"Beer-Lambert Law." Wikipedia. https://en.wikipedia.org/wiki/Beer%E2%80%93Lambert_law (Year: 2009).*

*Primary Examiner* — Tima M. McGuthry-Banks
(74) *Attorney, Agent, or Firm* — Plager Schack LLP; Mark H. Plager; Kara Verryt

(57) ABSTRACT

A process and system for the extraction of metals and gases contained on planets and asteroids (mining and refining) and for space debris remediation may include geographically localizing a material to be extracted/remediated; performing a risk analysis on the material to determine whether the material presents a serious risk of instantaneous fracture or disaggregation; using the risk analysis to qualify or refuse the material; capturing and stabilizing the qualified material in an ablation cylinder on a plasma machine (PERT station); deploying multiple magnetic hydraulic cylinders around the qualified material; equalizing and stabilizing the PERT station and the qualified material; performing ablation and destruction of the qualified material; and transforming pure elements from the ablation cylinder.

2 Claims, 3 Drawing Sheets

(51) Int. Cl.
*F03H 1/00* (2006.01)
*H01J 49/38* (2006.01)

(58) Field of Classification Search
USPC .................................................. 220/200–380
See application file for complete search history.

(56) References Cited

U.S. PATENT DOCUMENTS

| | | | |
|---|---|---|---|
| 9,409,658 B1 * | 8/2016 | Diamandis | ............... B64G 9/00 |
| 9,435,111 B2 * | 9/2016 | Cao | ........................... C22B 5/04 |
| 2003/0187318 A1 | 10/2003 | Remy | |
| 2015/0325100 A1 | 11/2015 | Hunter et al. | |

FOREIGN PATENT DOCUMENTS

| | | | | |
|---|---|---|---|---|
| WO | WO-2008064888 A1 * | 6/2008 | ............... | G21D 7/02 |
| WO | WO 2014 153570 A2 | 9/2014 | | |
| WO | WO 2016 004137 A10 | 1/2016 | | |

* cited by examiner

PLASMAS FOR EXTRATERRESTRIAL RESOURCES AND APPLIED TECHNOLOGIES (PERT) SPACE DEBRIS REMEDIATION, MINING, AND REFINING

RELATED APPLICATION

This application claims priority to provisional patent application U.S. Ser. No. 62/385,858 filed on Sep. 9, 2016, the entire contents of which is herein incorporated by reference.

BACKGROUND

The embodiments herein relate generally to space debris remediation and, more particularly, to a thermal plasma treatment technologies and materials processing of space debris.

Plasmas make up about 98% of the universe and are classified as the fourth state of matter. Deep space provides the ideal referential and conditions of a vacuum (ultra-vacuum, 10-14 to 10-17 torr) for creating plasma for applied technologies, including those for chemistry in extraterrestrial conditions. The vacuum in deep space is associated with extremely low temperatures compared to the average workable temperature on planets and their satellites. The gradient of the solar energy is acceptable for energy supplied, mainly in order to be associated with plasma machines.

Therefore, what is needed is process and system for extraterrestrial materials processing, such as transformation of minerals, metal salts, metal oxides, and free metals or alloys discovered on asteroids or asteroid belts or planets or moons of such planets to metals without any possible further recombination of the final products thereof, based on physical chemistry in dynamics of conducting gases using plasmas seeded with lanthanides (Ln3+), yttrium (Y3+), iron (Fe3+), helium (He), hydrogen (H2), and deuterium (D2) as well as other elements, such as atomic elements in a magneto gas dynamics (MGD) and magneto hydro dynamics (MHD) system in recycled high temperature pulsed and/or continuous powered plasmas, wherein the chemicals or atomic species may remain in the plasma for enough time to be transformed into pure metals with different grades of purities (technical grade to ultrapure grade).

SUMMARY

Some embodiments of the present disclosure include a process and system for the extraction of metals and gases contained on planets and asteroids (mining and refining) and for space debris remediation. The system and process may include geographically localizing a material to be extracted/remediated; performing a risk analysis on the material to determine whether the material presents a serious risk of instantaneous fracture or disaggregation; using the risk analysis to qualify or refuse the material; capturing and stabilizing the qualified material in an ablation cylinder on a plasma machine (PERT station); deploying multiple magnetic hydraulic cylinders around the qualified material; equalizing and stabilizing the PERT station and the qualified material; performing ablation and destruction of the qualified material; and transforming pure elements from the ablation cylinder.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
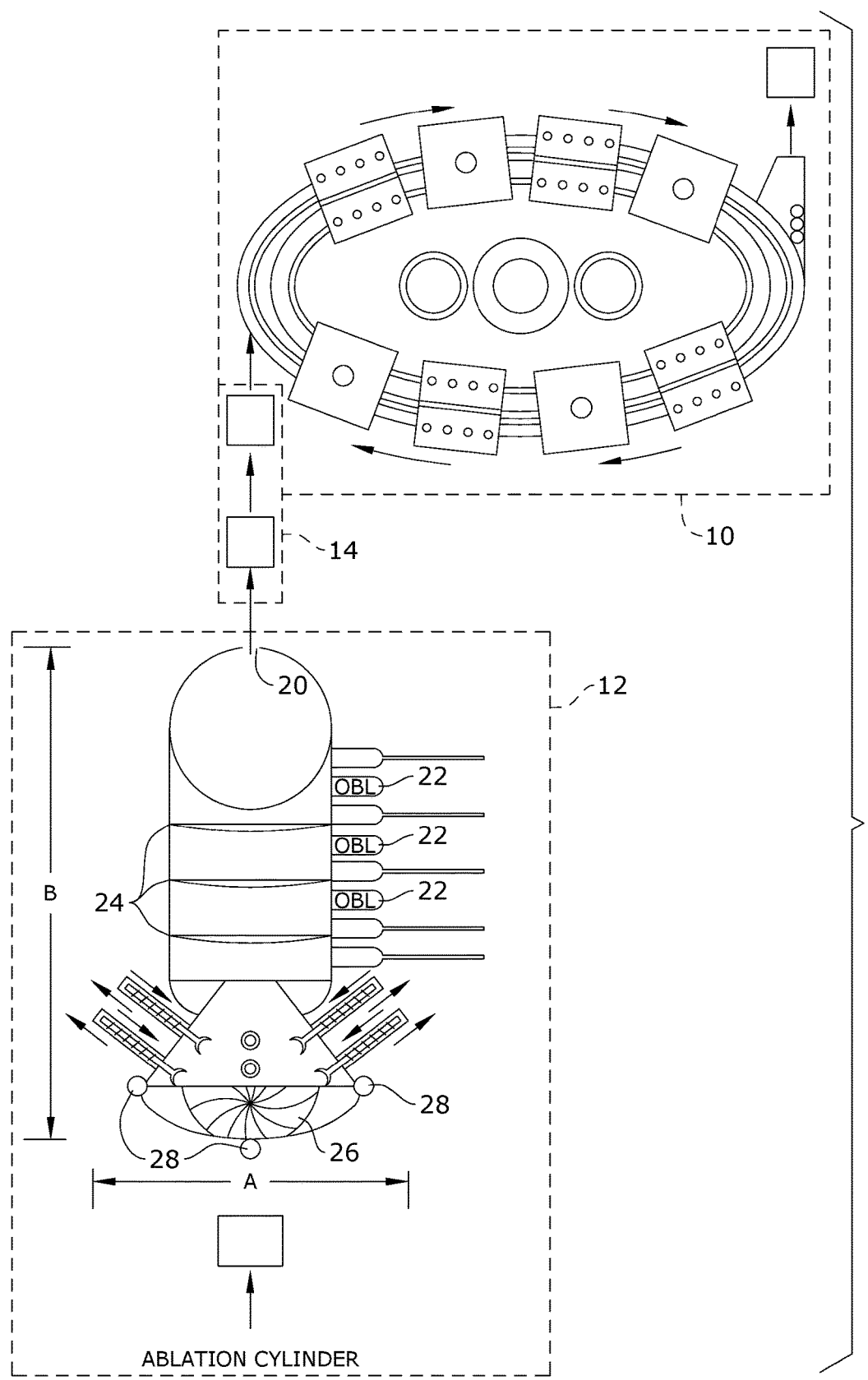
FIG. 1 is a schematic view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to process/transform extraterrestrial materials and may comprise the following elements. This list of possible constituent elements is intended to be exemplary only, and it is not intended that this list be used to limit the process and system of the present application to just these elements. Persons having ordinary skill in the art relevant to the present disclosure may understand there to be equivalent elements that may be substituted within the present disclosure without changing the essential function or operation of the device.

| | |
|---|---|
| a. | PERT Station |
| b. | Ablation Cone |
| c. | Radar Detection |
| d. | X-ray Diffraction |
| e. | (ICP-MS-AES) tools |
| f. | Radioactive Sensors |
| g. | Magnetometers |
| h. | Cameras |
| i. | GC-MS |
| j. | Grids |
| k. | Shutter 26s |
| l. | Laser Lines |
| m. | Plasma RF Line |
| n. | Accretion Spheres |
| o. | Robotics |
| p. | MHD-MGD Systems |

The various elements of the process and system of the present disclosure may be related in the following exemplary fashion. It is not intended to limit the scope or nature of the relationships between the various elements and the following examples are presented as illustrative examples only.

By way of example, and referring to FIGS. 1-5, some embodiments of the present disclosure include a method and system for extraterrestrial materials processing, the method and system comprising implementation in a closed loop device of toroidal shape or formed of a combination of geometric shapes, some of which may be linear and others which may be curved or semi-circular. As used herein, the system may be referred to as a "PERT Station." The PERT station may comprise magneto hydro dynamics-magneto gas dynamics (MHD-MGD) recycling systems 10, inductive plasma torches, and laser lines or ablation systems 14. The method may be adapted for robotic maintenance and processing sequences in an extraterrestrial environment.

Embodiments may include multiple different plasma PERT stations designed for different atomic elements. For example, embodiments may include a PERT station for lanthanides and paramagnetic ions; diamagnetic ions; ferromagnetic ions; transition metals; rare gases; silicon and iron-silicon alloys; germanium; hydrogen-oxygen-water recombination-pure carbon; precious medal groups (PMGs) and assimilated; volatiles; and the like. The method and system may also provide for the circulation and recycling of molecular elements, metal oxides, atomic vapors, raw materials, chemical and/or biological agents, and the like, aiming to neutralize said elements. The structure of the PERT station may vary depending on its intended use.

In some embodiments and as shown in FIG. 1, the system 10 may include a toroidal and quasi-circular machine, installed with a star mounting, comprising at least 3 inductive radiofrequency (RF) plasmas, 3 MHD-MGD (permanent magnets and/or solenoids) 36, a plasma ablation section 14, and a laser line for the treatment of solids, wherein the solids may include, for example, raw materials, rocks, part of an asteroid, barrels, drums, canisters as waste produced by extraterrestrial stations, etc.

Figure 2:
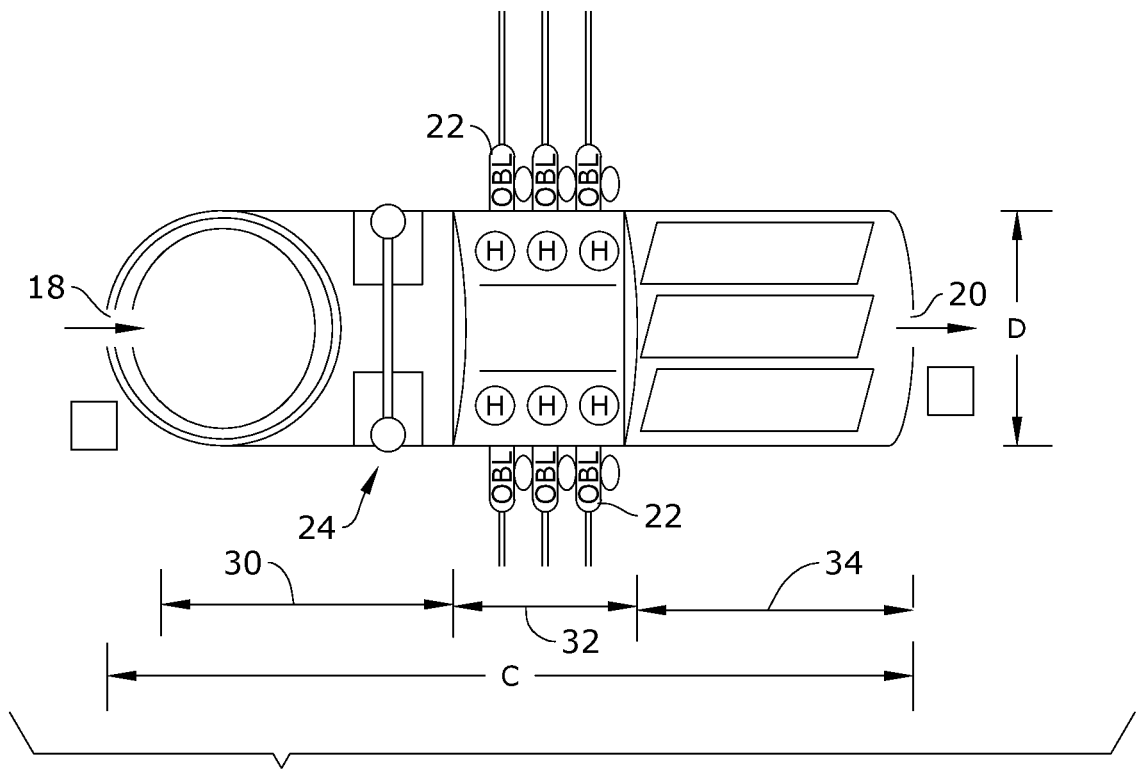
FIG. 2 is a schematic view of one embodiment of the present disclosure.

The system may include a material classification portion including x-ray diffraction tools, such as x-ray fluorescence (XRF) spectroscopy and inductively coupled plasma mass spectroscopy (ICP-MS) tools 28 to analyze the material to potentially be processed, and an ablation cylinder 12 operatively attached to a recycling/refining preparation section 10. As shown in FIGS. 1 and 2, the ablation cylinder 12 may comprise a cylinder inlet 18 designed to accept a material for processing, an atomic vapor deposition system 30, an electromagnetic section 32, a plurality of electrodes 34, and a cylinder outlet 20. The ablation cylinder 12 may include an external cone with a retractable iris 26 leading to the cylinder inlet 18. The atomic vapor deposition system 30 may include a calibration grid 24 to stabilize the material to be processed and calculate the volume of the material using, for example, lasers, thus calibrating the system for processing of the given material. Once the system has been calibrated, the material may then pass through the electromagnetic section 32, wherein the electromagnetic section 32 may comprise a plurality of optical Beer-Lambert coils (OBL) 22 and magnetic fields (H in the Figures), wherein the magnetic fields may concentrate the natural elements as well as lanthanides or iron, because of their magneto sensibility, depending on their Curie Point. Once the material has passed through the electromagnetic section 32, it may proceed to pass through a plurality of electrodes 34 positioned within the ablation cylinder 12.

After passing through the electrodes 34, the material may pass through the cylinder outlet 20 to the ablation/destruction section 14 of the system, described in more detail below in the description of Phase 4. The material then passes from the ablation/destruction section 14 to the recycling/refining preparation section 10 comprising at least 3 inductive RF plasmas and at least 3 MHD-MGD permanent magnets or solenoids.

Figure 3:
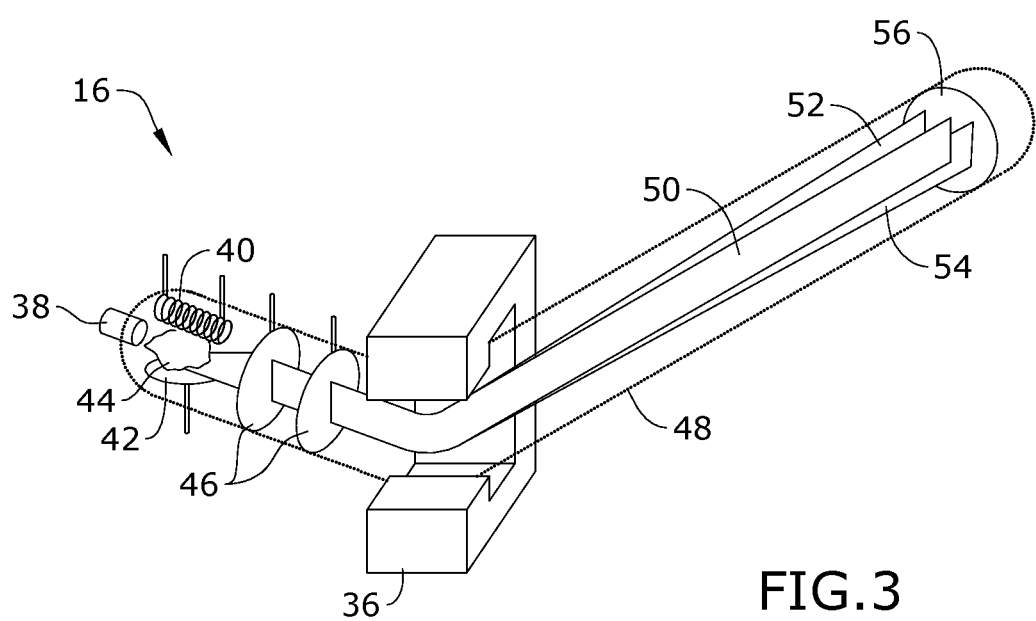
FIG. 3 is a schematic view of one embodiment of the present disclosure.
Figure 4:
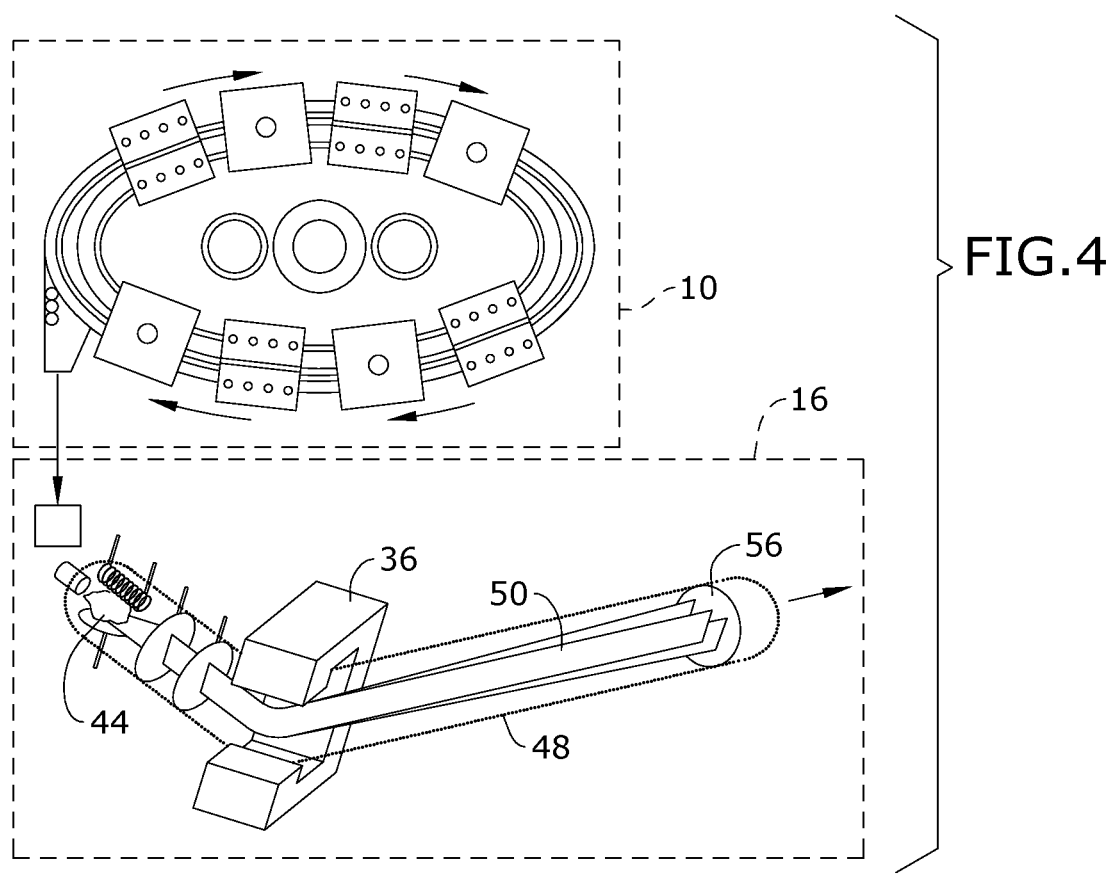
FIG. 4 is a schematic view of one embodiment of the present disclosure.
Figure 5:
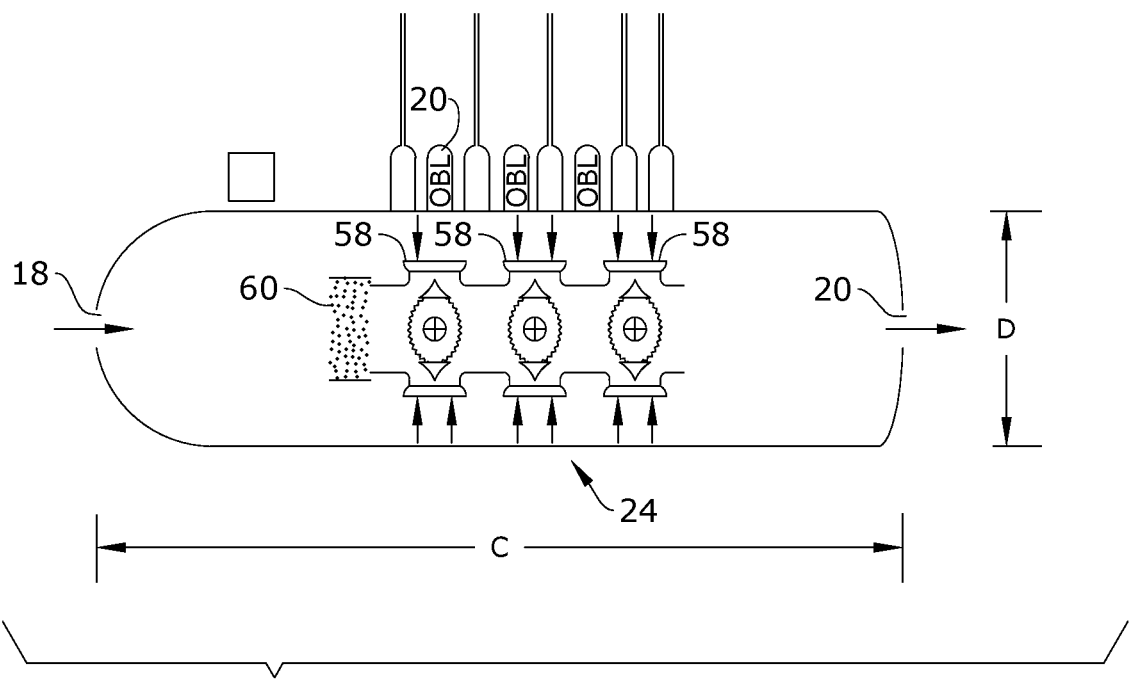
FIG. 5 is a schematic view of one embodiment of the present disclosure.

The recycling/refining preparation section 10 recycles the particles and atomic species (ions) using MGD-MHD motor-generator processes, MGD-MHD plasmas (under rare gases), or mixed gases (depending on the atomic species to be accelerated and circulated in the toroidal shaped section 10. Each millisecond, the plasma charged in the atomic species is accelerated as a motor system and, immediately after that millisecond, the plasma is working as a generator system, creating electric current of about 5000 cycles per minute for the recycling system. When the ions are correctly concentrated in the recycling/refining preparation section 10, which can be automatically verified by atomic spectroscopy, they are introduced into a resonance ions chamber, as shown in FIG. 5. The resonance ions chamber may comprise an inlet 18 designed and positioned to accept the materials from the ablation/destruction section 14. The materials may then pass through plasma 60 and a calibration grid 24 comprising a plurality of plasma electrochemistry cells 58 with OBLs 22 positioned in series. After the materials have passed through the calibration grid 24, they may travel through the outlet 20 to the mass spectroscopy section 16, as shown in FIG. 3. The mass spectroscopy section 16 may comprise an injection port 38 through which the material may pass. An electron source 44 and heater 40 may be positioned proximate to the injection port 38 to transform the material into an ionized sample 42. Particles 46 of the ionized sample 42 may accelerate into a magnetic field 48 created by a magnet 36, such as a substantially C-shaped magnet, creating a charged particle beam 50 which may separate metals and elements into lightest particles 52 and heaviest particles 54. A detector 56 may be positioned within the mass spectroscopy section 16, wherein the detector 56 may either record the induced charge or the current produced when an ion passes by or hits a surface of the detector 56. In a scanning instrument, the signal produced in the detector 56 during the course of the scan versus where the instrument is in the scan will produce a mass spectrum or a record of ions as a function of m/e.

In embodiments, the mass spectroscopy section 16 and processing may occur directly after the recycling/refining preparation section 10 and process. Alternatively, the resonance ions chamber, as shown in FIG. 5, may be built into the recycling/refining preparation section 10 and process. As a result of the structure of the system, the system may process extraterrestrial materials for space debris remediation.

While in embodiments, the overall size of the system may vary depending on intended use, in some embodiments, the width A in FIG. 1 may be about 8 m, and the height B may be about 30 m. Moreover, the length C in FIGS. 2 and 5 may be about 800 cm, and the height D may be about 60 cm.

The recycling system may allow for a plasma enriched by other elements to confine, during several minutes, raw materials, pure elements, metal oxides, metal salts, atomic vapors, or hazardous elements, and to destroy these materials definitively, bearing in mind that in conventional plasmas (included in RF plasmas), the passage of dangerous molecules is limited to a few milliseconds, only. The method and system may take into consideration the atomic mass selection (e/m) and cell resonances, including for hyperfine structures of atoms. The atomic selection section may be directly joined to the MHD-MGD process.

The method and system may further include modifying the criteria of the plasma and chemical efficiency by introducing atomic elements (i.e., seeding the plasma) with $Fe^{3+}$, $Y^{3+}$, $Ln^{3+}$ (lanthanides), actinides, and the like and gases, such as $N_2$, $O_2$, He, $D_2$, $H_2$, and $CO_2$.

The method and system of the present disclosure may include the use of plasma tools using pure silicium oxide (quartz) and boron nitrides, carbon-silicon-lanthanides composite material, pure carbon, and diamonds to produce specific materials that could be used in quantum machines (Qubit), for artificial intelligence (AI), and neural robotics to avoid the decoherence event, or beryllium oxide or zirconium oxide as geometric materials. The method and system may form new ceramic compounds with lanthanides, yttrium, zirconium, silicium, boron, calcium, potassium, actinides, depleted uranium, and the like.

As a result of using the PERT station, the raw materials (such as metal salts, metal oxides, and atomic species) remain within the plasma 60 for enough time to be transformed into pure metals, while the remaining gases (such as Ar, $N_2$, $O_2$, and $H_2$) resulting from the operation may be separated from the pure metals and stored in appropriated tanks. The method and system may be based on the properties of ionized gases (plasmas at LTE (Local Thermal Equilibrium) or PLTE (Partial Local Equilibrium)) working as a motor and/or generator, assuming the circulation of atomic species in the toroidal section for thousands of cycles per minute (recycling), applied in deep space or on planets or their satellites for extraterrestrial mining and refining operations.

The method and system of the present disclosure may vary depending on the materials being processed (i.e., asteroids, soils, undergrounds of planets or its satellites, or space debris), but in any case may comprise a plurality of phases. For example, in the case of deep space objects or asteroids, the phases may comprise, in order, phase 1 (geometric localization); phase 2 (risk analysis—uncertainties); phase 3 (entry in the cone of the ablation cylinder 12) (shown in the bottom half of FIG. 1); and phase 4 (ablation and destruction of the asteroid in the ablation and destruction section 14) (shown in the middle of FIG. 1).

During phase 1, the system may use radar to localize the asteroid and approach it in deep space for required analysis sequences at small distances with x-ray-ultrasound diffraction tools and inductive coupled plasma-mass spectroscopy (ICP-MS) or inductive coupled plasma atomic emission spectroscopy (AES) 28 tools. The approach of the asteroid may be assured with inertial motors systems and hyperbolic geometry to avoid the risk of instabilities of the asteroid and, thus, preventing the displacement of the center of microgravity of the object or the asteroid.

During phase 2, RF and magnetometers may determine whether an object presents a serious risk of instantaneous fracture or disaggregation due to the presence of water or hydrocarbons. The parameters may be examined and analyzed before operation with plasmas on the object. As a result, the asteroid will either be qualified and moved into phase 3 or refused.

Analyzing the risk may involve evaluating the composition of the part of the object, asteroid, or debris to be treated. If an analysis, such as an ICP, MS, AES, GC, MS, or XRF, can detect radioactive elements, the mission of refining asteroids or remediation of the debris will be aborted or redirected to another plasma machine designed especially for the elimination of radioactive species. Additionally, if the asteroid or part of the asteroid, after capture, contains more than 30% water, preliminary treatments may be used to recover water vapor by means of a plasma torch or radio wave coils to separate minerals from the water. Refining may then begin afterwards. If the asteroid is treated without taking into consideration a high percentage of water, the part of the asteroid being treated may explode with thermal shock.

During phase 3, an external cone of the PERT station may be equipped with several tools to stabilize the asteroid. The total volume of the asteroid may be calculated by laser sensors when the asteroid is inside the ablation cylinder 12. The PERT station may move to the asteroid via the help of robotics. However, the asteroid will not move to the PERT station. While the asteroid is in the ablation cylinder 12, several magnetic hydraulic cylinders may be deployed around the asteroid. When this happens, the two micro gravity operators (the PERT station and the asteroid) may be equalized, and the system may be considered as stable. In order for the PERT station to be able to handle the asteroid, the asteroid may be smaller than the entry dimension of the ablation cylinder 12 by, for example, at least about 3 times. In embodiments, the external cone of the ablation cylinder 12 may be formed by a single geometric retractable iris 26 (diaphragm or shutter). The iris 26 may be capable of blocking the entry of the asteroid to the ablation chamber. Thus, during the ablation process and plasma treatment, the iris 26 may be closed. The iris 26 may be made of any suitable material and, in some embodiments, comprises an alloy of silicon-iron-tungsten. The ablation cylinder 12 may be filled with plasmagene gases when not in use.

Phase 4 (ablation and destruction of the part of the asteroid) may include multiple steps, but may only be engaged when the two microgravity operators are equalized and the iris 26 is closed. The external surface of the ablation cylinder 12 may include lasers ($CO_2$—$N_2$—Hex) and have a power supply of at least 10-20 Kw. The external surface of the ablation cylinder 12 may be associated with several RF plasma torches (inductive plasmas) directly applied on rocks or on the asteroid to complete the first action of the laser's line operation. The plasmagene gas of the plasma torches may be the same as the equilibrium gas in the PERT station, wherein the equilibrium of the mix of gases may be calculated with the ICP-MS, ICP-AES, and ICP-MS tools. When the analysis parameters are completed, the thermal MHD and MGD operation is launched to completely dissociate the species (molecules, metal oxides, raw materials, etc.) and obtain atomic vapors of the mix of metals. Argon, which may be used as a reducer plasmagene gas, may be used to complete this task, wherein the argon may be provided by the thermal chemistry applied to the rocks and/or asteroids and from the ground of planets. The argon can be considered a by-product.

Thus, phase 4 may comprise preparation of the atomic species and pure elements, using a toroidal section MHD-MGD apparatus. The magneto electrodynamic apparatus may be the main portion of the plasmic tool used to transform in pure elements the atomic species or atomic vapor coming from the ablation cylinder 12 and PERT line at LTE (local thermal equilibrium). The required duration of the recycling operation in the MHD-MGD machine may be calculated using the results from the ICP-MS-AES-Beer Lambert diagnostic line, preferred to RF-KLYSTRON tool.

After the atomic species and pure elements have been prepared, they may be introduced into the accretion sphere of the PERT station, which may help get pure metals from the raw material output from the ablation cylinder 12, PERT line, and MHD-MGD tools. The dimensions of the accretion sphere may be dependent on the raw materials to be treated and dissociated in metals. Each accretion sphere may be, for example, about 30 meters (m) in diameter and may be formed of several (at least 10 to 50) small spheres of, for example, 8 m in diameter. Each sphere may be specialized to receive a precise pure element or mix of elements (lanthanides). Unrelated elements may not be mixed in the accretion sphere, because the atomic mass of the elements may be "too relative" with different magnetic properties (Curie's Law) and specific point values (diamagnetic paramagnetic properties) at standard conditions. As a result, multiple methods may be used to separate the atomic species and concentrate them (refining operations). In embodiments, only one accretion sphere (8 meters) may be reserved inside the principal sphere (30 meters) to receive mixed atomic vapors (La to Lu serial), yttrium, and scandium. Other vapors coming from the PERT station line and ablation cylinder 12 may be stored in other specific accretion spheres, including water ($H_2O$-$D_2O$-$T_2O$) as strategic resources.

The MHD-MGD for thermal treatment and recycling of atomic species in plasmas (motor-generator system) may be applied to asteroids and to mining on planets and to space debris remediation.

Multiple methods may be applied to refine the extraterrestrial materials. A preferred embodiments for the thermal treatment and recycling of the atomic species (motor-generator system) may be applied to asteroids and to mining on planets and to space debris remediation.

A first method may comprise recovering metals by vapor deposition coming from the plasma machines to be recovered and/or introduced in the electrostatic section, the electromagnetic section, the mass section, and the resonance frequency for ions selections section. Vapor deposition may be a prominent part of refining for Fe—Co—Ni and Si—Ge. By regulating the temperature gradient and the vacuum control, oxygen ($O_2$), carbon dioxide ($CO_xO_y$) and sulfur ($S_xO_y$) may be dissociated in thermal zones and pure elements (metal at fundamental state) may be produced.

Oxygen ($O_2$) may be produced by the Pert station with the plasma tool of the present disclosure from $CO_2$ (carbon dioxide) at an atmosphere of planets as well as on Mars.

A second method may include using electrostatic and electromagnetic selections to separate transition metal compounds from semi-conductors or non-metals, and may comprise separating metals (ionized) from elements that cannot be treated by electrostatic or electromagnetic fields. This will deliver metals on one side and elements that cannot be treated by electrostatic or electromagnetic fields on the other side.

A third method may include performing mass atomic selections in ultravacuum conditions ($10^{-14}$ to $10^{-17}$ torr) and may be referred to as a mass spectrometer apparatus. In deep space, the natural standard conditions are ideal regarding ultravacuum and very low temperature gradients. The method may use the mass spectro(metry)(scopy) formula, q/m.

When the plasma is at local thermal equilibrium (LTE) or partial local thermal equilibrium (PLTE) in the PERT line or toroidal section under MGD-MHD conditions, the Saha-Boltzmann equation and conditions may allow the plasma to be considered an ideal gas at equilibrium criteria state conditions.

The separation and selection of ions (resonance frequency for ions) may comprise introducing the species as metallic ions (coming from plasma sources MHD-MGD) and may be placed in cyclotron resonance section and collected on specific electrodes 34 (Ni—Co-lanthanides (rare earths)). The following is an example for the plasma frequency for electrons:

wp (plasma frequency): $9.10^3 \times (10^{16})^{1/2}$, where n ($n=10^{16}$) is the plasma density and $10^{13} < n < 10^{18}$ For Argon plasma: densities Saha-Boltzmann equation:

$$8.13 \times 10^{16} \text{ cm}^{-3} < |n| < 4.31 \times 10^{17} \text{ cm}^{-3} \sim 10{,}000K$$

Example (with nickel ions, wherein I-II-III are states of ionization):
  $Ni^I$ density=$1.41 \times 10^{11}$ cm$^{-3}$
  $Ni^{II}$ density=$4.5 \times 10^9$ cm$^{-3}$
  $Ni^{III}$ density=$4.7 \times 10^8$ cm$^{-3}$
  $Ar^I$ density=$4.31 \times 10^{17}$ cm$^{-3}$ The method and system of the present disclosure may be used in an extraterrestrial environment and for the extraction of metals and gases contained on planets and asteroids or for space debris remediation. The goal may be to influence plasmas by waves or by external fields to create a Cyclotron Resonance frequency (CR) and collect atomic species of selected metals. The methods may also allow for the extraction and/or synthesizing of water from soils of planets or undergrounds and satellites or asteroids. The method and system may also create several matrices that can be used in the fields of condensed matter and supraconductivite to be used, such as anti-gravity devices and quantum computers.

The method and system of the present disclosure may form metallic gaseous pseudo solutions in a reducing or oxidizing plasma medium. The said metallic "solutions" obtained may constitute a means of mining and refining treatment for precious metals and assimilated. The metallic gaseous solutions may be used in nanotechnologies related to biology, electronics, energy, biomedicine, and the like.

The method and system of the present disclosure may be used in the manufacturing of pipelines, walls, shielding and large structures for spacecrafts, including the properties to convert radiation from solar activity or near planets into electricity or magnetic field. The process may produce pure Bi (Bismuth), which may be used in Electromagnetic shielding associated with Silicon-Iron (Si—Fe) shields of the spacecraft or PERT station. The method and system may also produce silicium and germanium as gaseous electrodes 34 for electron capture and current production in the presence of UV radiation in the geometric plasma section.

The system of the present disclosure may be used to treat several hundred tons of debris per year and transform the debris into by products to be smelted and utilized as raw materials for special purpose or for manned or robotic stations. Organic molecules may be completed destroyed and transformed into water or other basic chemicals.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A process for the extraction of metals and gases contained on planets and asteroids and for space debris remediation, the process comprising:
  propelling a plasmas for extraterrestrial resources and applied technologies (PERT) station into space;
  geographically localizing, in outer space, a material to be extracted/remediated, wherein the material is space debris;
  performing a risk analysis on the material to determine whether the material presents a serious risk of instantaneous fracture or disaggregation;
  using the risk analysis to qualify or refuse the material;
  capturing and stabilizing the qualified material in an ablation cylinder on the PERT station;
  deploying multiple magnetic hydraulic cylinders around the qualified material;
  equalizing and stabilizing the PERT station and the qualified material;
  performing ablation and destruction of the qualified material; and
  transforming pure elements from the ablation cylinder,
  wherein the PERT station comprises a plasma machine comprising:
    the ablation cylinder designed to accept a material to be processed, the ablation cylinder comprising:

a cylinder inlet designed to accept the material to be processed; and an external cone with a retractable iris operatively attached to the cylinder inlet;

an ablation/destruction section operatively attached to the ablation cylinder;

a recycling/refining preparation section operatively attached to the ablation/destruction section; and a mass spectroscopy section operatively attached to the recycling/refining preparation section, wherein the recycling/refining preparation section is a toroidal shaped magneto hydro dynamics-magneto gas dynamics (MHD-MGD) apparatus.

2. The process of claim 1, wherein the ablation cylinder further comprises:

a cylinder housing operatively attached to the cylinder inlet;

an atomic vapor deposition system, an electromagnetic section, and a plurality of electrodes, each of which is positioned within the cylinder housing; and a cylinder outlet operatively attached to an end of the cylinder housing distal from the cylinder insert.

\* \* \* \* \*